(12) United States Patent
Bendall

(10) Patent No.: US 10,666,927 B2
(45) Date of Patent: May 26, 2020

(54) METHOD AND DEVICE FOR INSPECTION OF AN ASSET

(71) Applicant: General Electric Company, Schenectady, NY (US)

(72) Inventor: Clark Alexander Bendall, Syracuse, NY (US)

(73) Assignee: Baker Hughes, a GE Company, LLC, Houston, TX (US)

( * ) Notice: Subject to any disclaimer, the term of this patent is extended or adjusted under 35 U.S.C. 154(b) by 269 days.

(21) Appl. No.: 15/459,650

(22) Filed: Mar. 15, 2017

(65) Prior Publication Data

US 2018/0270465 A1   Sep. 20, 2018

(51) Int. Cl.
| | |
|---|---|
| G06T 7/00 | (2017.01) |
| H04N 13/254 | (2018.01) |
| G02B 23/24 | (2006.01) |
| G02B 23/02 | (2006.01) |
| G01N 21/954 | (2006.01) |

(Continued)

(52) U.S. Cl.
CPC ....... H04N 13/254 (2018.05); G01B 11/2513 (2013.01); G01B 11/2545 (2013.01); G01N 21/8851 (2013.01); G01N 21/954 (2013.01); G02B 23/02 (2013.01); G02B 23/2415 (2013.01); H04N 13/239 (2018.05); H04N 13/271 (2018.05); *G02B 23/2446* (2013.01); *G02B 23/2461* (2013.01); *H04N 2013/0081* (2013.01); *H04N 2213/001* (2013.01)

(58) Field of Classification Search
CPC ............... H04N 13/254; H04N 13/271; H04N 2213/001; G01N 21/954; G02B 23/02; G02B 23/2415; G02B 23/2461; G02B 23/2446

See application file for complete search history.

(56) References Cited

U.S. PATENT DOCUMENTS

| | | | |
|---|---|---|---|
| 5,633,675 A | 5/1997 | Danna et al. | |
| 6,784,662 B2 * | 8/2004 | Schlicker | G01N 27/82 324/239 |

(Continued)

FOREIGN PATENT DOCUMENTS

WO   2017/014691 A1   1/2017

OTHER PUBLICATIONS

International Search Report and Written Opinion issued in connection with corresponding PCT Application No. PCT/US2018/017392 dated Dec. 3, 2018.

(Continued)

*Primary Examiner* — Howard D Brown, Jr.
(74) *Attorney, Agent, or Firm* — Mintz Levin Cohn Ferris Glovsky and Popeo, P.C.

(57) ABSTRACT

A method and device for inspection of a rotating asset is disclosed. In one embodiment, the inspection device can include textured pattern projection system for projecting a textured pattern onto an object surface to provide additional surface details to improve stereoscopic image matching. In another embodiment, the inspection device can be configured to save selected images a rotating object when the object is located in a selected or trigger position in different illumination modes. The saved selected images can be transmitted and stored in a cloud-based server and analyzed in an automated fashion.

16 Claims, 12 Drawing Sheets

(51) Int. Cl.
*H04N 13/271* (2018.01)
*G01N 21/88* (2006.01)
*H04N 13/239* (2018.01)
*G01B 11/25* (2006.01)
*H04N 13/00* (2018.01)

(56) References Cited

U.S. PATENT DOCUMENTS

| | | | |
|---|---|---|---|
| 7,170,677 B1 | 1/2007 | Bendall et al. | |
| 7,532,332 B2 | 5/2009 | Gomercic et al. | |
| 8,786,682 B2 | 7/2014 | Shpunt et al. | |
| 2008/0247636 A1* | 10/2008 | Davis | G06T 19/00 382/152 |
| 2012/0056982 A1 | 3/2012 | Katz et al. | |
| 2013/0038689 A1 | 2/2013 | McDowall | |
| 2013/0113916 A1* | 5/2013 | Scheid | G06T 7/0004 348/85 |
| 2013/0215235 A1 | 8/2013 | Russell | |
| 2013/0335530 A1* | 12/2013 | Hatcher, Jr. | G02B 23/2484 348/46 |
| 2015/0300920 A1* | 10/2015 | DeAscanis | G01M 15/14 356/614 |
| 2015/0317816 A1* | 11/2015 | Bendall | G01B 21/04 345/419 |
| 2015/0348253 A1* | 12/2015 | Bendall | G06T 7/0004 348/86 |
| 2016/0171705 A1* | 6/2016 | Bendall | G01B 11/03 382/103 |
| 2016/0196643 A1* | 7/2016 | Bendall | G06T 7/50 382/108 |
| 2017/0191946 A1* | 7/2017 | Smith | G01N 21/8901 |
| 2018/0103246 A1* | 4/2018 | Yamamoto | A61B 1/00 |

OTHER PUBLICATIONS

Urquhart, C.W. and Siebert, J.P., Towards Real-Time Dynamic Close Range Photogrammetry, Sep. 1993, SPIE Videometrics II, Boston, USA (13 pages).
Ensenso Camera Operation (https://en.ids-imaging.com/ensenso-3d-camera-operating.html), accessed Mar. 13, 2017.

* cited by examiner

METHOD AND DEVICE FOR INSPECTION OF AN ASSET

BACKGROUND

The subject matter disclosed herein relates to a method and device for inspection of an asset (e.g., blades of a turbine engine).

Video inspection devices (or optical devices), such as video endoscopes or borescopes, can be used to inspect a surface of an object to identify and analyze anomalies (e.g., pits or dents) on the object that may have resulted from, e.g., damage, wear, corrosion, or improper installation. A video inspection device can be used to capture and display a two-dimensional image of the surface of a viewed object showing the anomaly to determine the dimensions of an anomaly on the surface. This two-dimensional image of the surface can be used to generate three-dimensional data of the surface that provides the three-dimensional coordinates (e.g., (x, y, z)) of a plurality of points on the surface.

There are various existing techniques that can be used to provide the three-dimensional coordinates of the surface points in the two-dimensional image (e.g., stereoscopic imaging and structured light methods such as phase shift analysis, phase shift moiré, laser dot projection, etc.). Some of these techniques, including structured light methods, require multiple images (e.g., 3 to 6 images) captured sequentially. In inspecting a rotating object (e.g., turbine blades) rotating past the video inspection device using a structured light method, the rotating object would have to stop to allow the inspector to take the required multiple images, which is not ideal. Stereoscopic imaging can be used to provide the three-dimensional coordinates of the surface points in inspecting these rotating objects since typically a stereo image taken at a single point in time is required with multiple sensors synchronized to each other. Since stereoscopic imaging is dependent upon finding the same points on the surface, surfaces that have minimal texture (e.g., a surface with a ceramic thermal barrier coating) can result in false matching and inaccurate three-dimensional mapping.

In one example, a video inspection device can be used to inspect a turbine blade of an engine on an aircraft or power generation turbine. The video inspection device is typically inserted through a borescope port in the turbine between stationary vanes to inspect the turbine blades of an adjacent stage of rotating turbine blades. While the video inspection device is fixed in position, the core of the turbine is rotated such that the turbine blades pass through the field of view of the video inspection device. It is common for video to be recorded showing the turbine blades passing by. In addition, two-dimensional still images of selected turbine blades (e.g., turbine blades that have anomalies that the inspector notices) may also be captured during the inspection. Since capturing two-dimensional still images of all of the turbine blades requires large amounts of data that is difficult to transmit and manage, an inspection may not capture a two-dimensional image of each turbine blade, preventing an inspection from obtaining three-dimensional data for each turbine blade.

Furthermore, video of the inspection is generally compressed, which can lead to compression artifacts reducing its usefulness for automated analysis. Since the video and still images provide only two-dimensional data, any automated analysis generally relies on color, edge detection, etc. to try to assess turbine blade condition. Furthermore, any automated analysis may also either perform complicated three-dimensional model matching or make assumptions about magnification, optical distortion, etc. in order to quantify the sizes of identified indications since the position of the video inspection device with respect to the turbine blades can vary during and between inspections.

SUMMARY

A method and device for inspection of an asset is disclosed. In one embodiment, the inspection device can include a textured pattern projection system for projecting a textured pattern onto an object surface to provide additional surface details to improve stereoscopic image matching. In another embodiment, the inspection device can be configured to save selected images of a rotating object when the object is located in a selected or trigger position in different illumination modes. The saved selected images can be transmitted and stored in a cloud-based server and analyzed in an automated fashion.

An advantage that may be realized in the practice of some disclosed embodiments of the inspection device is the collection of high quality images for each rotating industrial asset (e.g., turbine blades) in an inspection, where each image is taken from a consistent perspective and position enabling automated analysis of the rotating objects. By saving only selected images of turbine blades in a selected viewing position in the frame, images for each turbine blade can be saved and used to create three-dimensional surface maps for each turbine blade without requiring an excessive amount of data to be transferred or stored. Enabling automated analysis of the industrial asset can allow for predictive maintenance and asset performance management. In addition, adding a textured pattern to an object surface provides sufficient surface detail to allow the creation of a more accurate three-dimensional surface map via improved stereo matching on a surface that does not otherwise have sufficient detail.

In one embodiment, a device for inspection of an asset is disclosed. The device includes a probe comprising a first image sensor having a first field of view and a second image sensor having a second field of view configured for obtaining a stereoscopic image, one or more inspection mode light emitters configured for providing illumination of the industrial asset during an inspection mode, and a textured pattern projection system for projecting a textured pattern on the industrial asset. In one embodiment, the textured pattern projection system includes one or more measurement mode light emitters configured for providing illumination of the industrial asset during a measurement mode, a textured pattern located proximate the one or more measurement mode light emitters, and a textured pattern optics system for projecting the textured pattern onto the industrial asset, wherein the textured pattern is located between the one or more measurement mode light emitters and the textured optics system.

In another embodiment, a method for inspecting an asset with an inspection device is disclosed. The method includes operating the inspection device in a first illumination mode, capturing an image of the industrial asset in the first illumination mode, determining if the industrial asset is in a predetermined trigger position in the image, saving a first image of the industrial asset in the first illumination mode when the industrial asset is in the predetermined trigger position, operating the inspection device in a second illumination mode, capturing a second image of the industrial asset in the second illumination mode, and saving the second image of the industrial asset in the second illumination mode.

The above embodiments are exemplary only. Other embodiments are within the scope of the disclosed subject matter.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the disclosed subject matter encompasses other embodiments as well. The drawings are not necessarily to scale, emphasis generally being placed upon illustrating the features of certain embodiments of the invention. In the drawings, like numerals are used to indicate like parts throughout the various views.

DETAILED DESCRIPTION

Embodiments of the disclosed subject matter provide techniques for performing inspection of an asset. The inspection device can include a textured pattern projection system for projecting a textured pattern onto an object surface to provide additional surface details to improve stereoscopic image matching. The inspection device can be configured to save selected images of a rotating object when the object is located in a selected or trigger position rather than saving all images. The saved selected images can be transmitted and stored in a cloud-based server and analyzed using automated analysis. Other embodiments are within the scope of the disclosed subject matter.

Figure 1:
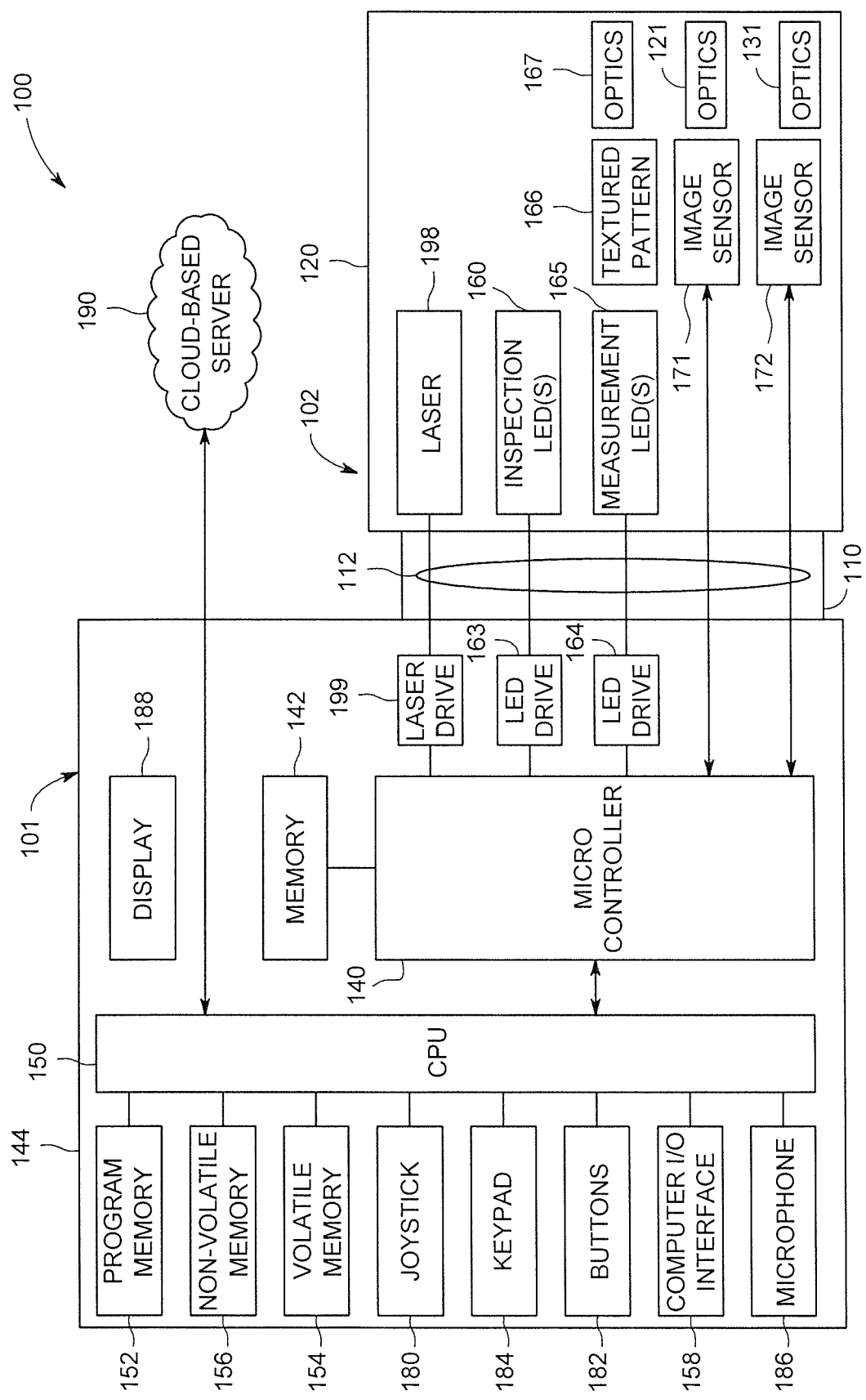
FIG. 1 is a block diagram of an exemplary video inspection device.

FIG. 1 is a block diagram of an exemplary video inspection system 100 that can include a video inspection device 101 and a cloud-based server 190. The video inspection device 101 shown in FIG. 1 is exemplary and that the scope of the invention is not limited to any particular video inspection device 101 or any particular configuration of components within a video inspection device 101.

Video inspection device 101 can include an elongated probe 102 comprising an insertion tube 110 and a head assembly 120 disposed at the distal end of the insertion tube 110. Insertion tube 110 can be a flexible or rigid tubular section through which all interconnects between the head assembly 120 and probe electronics 144 are passed. Head assembly 120 can include a first image sensor 171 and a second image sensor 172 for performing stereoscopic imaging. The first image sensor 171 and the second image sensor 172 can be a solid state CCD or CMOS image sensors for capturing an image of the viewed object. The first optics system 121 can be used for guiding and focusing light from the viewed object onto the first image sensor 171. The second optics system 131 can be used for guiding and focusing light from the viewed object onto the second image sensor 172.

The head assembly 120 can also include inspection mode light emitters (e.g., LEDs) 160 for providing diffuse illumination of the object surface during an inspection mode. The probe electronics 144 can include an inspection mode light emitter (LED) drive 163 for driving the inspection mode light emitters 160 as directed by the microcontroller 140. The head assembly 120 can also include measurement mode light emitters (e.g., LEDs) 165 for providing illumination of the object during measurement mode. As will be discussed in more detail with respect to FIG. 2, a textured pattern 166 can be placed proximate the measurement mode light emitters 165 such that the illumination from the measurement mode light emitters 165 passes through the textured pattern 166, wherein the textured pattern 166 is focused by the textured pattern projection optics system 167 onto the object under inspection. The probe electronics 144 can include a measurement mode light emitter (LED) drive 164 for driving the measurement mode light emitters 165 as directed by the microcontroller 140. In an alternate embodiment, a single drive circuit can be used to power either the inspection mode light emitters 160 or the measurement mode light emitters 165 via a switching element (not shown). In addition and as will be discussed in more detail with respect to FIGS. 2 and 11, the head assembly 120 can also include a projected light emitter (e.g., a laser or LED) 198 for projecting a light pattern offset from the image sensors 171, 172 onto the object. The probe electronics 144 can include a projected light drive 199 for driving the projected light emitter 198 as directed by the microcontroller 140.

The image sensors 171, 172 can include a plurality of pixels formed in a plurality of rows and columns and can generate image signals in the form of analog voltages representative of light incident on each pixel of the image sensors 171, 172. The image signals can be propagated to an imager harness 112, which provides wires for control and video signals between the image sensors and the probe electronics 144. In an alternate embodiment, the image sensors 171, 172 may include on-chip analog to digital conversion of the analog voltages such that digital signals representative of the analog voltages are transmitted through imager harness 112 to probe electronics 144 using a standard interface format such as the Mobile Industry Processor Interface Camera Serial Interface (MIPI CSI) or low voltage differential signaling (LVDS), etc. The probe electronics 144 can provide a collection of functions for operating the video inspection device 101. The probe electronics 144 can also include a memory 142, which can store, e.g., the calibration data for the probe 102. The probe electronics 144 can also determine and set gain and exposure settings, store and read calibration data, and control the light delivered to the object.

The video inspection device 101 can include an integral display 170 that can be an LCD screen built into the video inspection device 101 for displaying various images or data (e.g., the image of the viewed object, menus, cursors, measurement results) to an inspector.

The microcontroller 140 can provide/receive commands, status information, streaming video, still video images, and graphical overlays to/from the CPU 150 and may be comprised of FPGAs, DSPs, or other processing elements which provide functions such as image capture, image enhancement, graphical overlay merging, distortion correction, frame averaging, scaling, digital zooming, overlaying, merging, flipping, motion detection, and video format conversion and compression.

The CPU 150 can be used to manage the user interface by receiving input via a joystick 180, buttons 182, keypad 184, and/or microphone 186, in addition to providing a host of other functions, including image, video, and audio storage and recall functions, system control, and measurement processing. The joystick 180 can be manipulated by the user to perform such operations as menu selection, cursor movement, slider adjustment, and articulation control of the probe 102, and may include a push-button function. The buttons 182 and/or keypad 184 also can be used for menu selection and providing user commands to the CPU 150 (e.g., freezing or saving a still image). The microphone 186 can be used by the inspector to provide voice instructions to freeze or save a still image.

The CPU 150 can also communicate with CPU program memory 152 for storage of programs executed by the CPU 150. In addition, the CPU 150 can be in communication with volatile memory 154 (e.g., RAM), and non-volatile memory 156 (e.g., flash memory device, a hard drive, a DVD, or an EPROM memory device). The non-volatile memory 156 is the primary storage for streaming video and still images.

The CPU 150 can also be in communication with a computer I/O interface 158, which provides various interfaces to peripheral devices and networks, such as USB, Firewire, Ethernet, audio I/O, and wireless transceivers. This computer I/O interface 158 can be used to save, recall, transmit, and/or receive still images, streaming video, or audio. For example, a USB "thumb drive" or CompactFlash memory card can be plugged into computer I/O interface 158. In addition, the video inspection device 101 can be configured to send frames of image data or streaming video data to an external computer or server, including by wireless connection to a cloud-based server 190. The video inspection device 101 can incorporate a TCP/IP communication protocol suite and can be incorporated in a wide area network including a plurality of local and remote computers, each of the computers also incorporating a TCP/IP communication protocol suite. With incorporation of TCP/IP protocol suite, the video inspection device 101 incorporates several transport layer protocols including TCP and UDP and several different layer protocols including HTTP and FTP. The microcontroller 140 and CPU 150 can communicate in a number of different ways, including PCI Express, USB, Ethernet, etc.

It will be understood that, while certain components have been shown as a single component (e.g., microcontroller 140 and CPU 150) in FIG. 1, multiple separate components can be used to perform those described functions.

Figure 2:
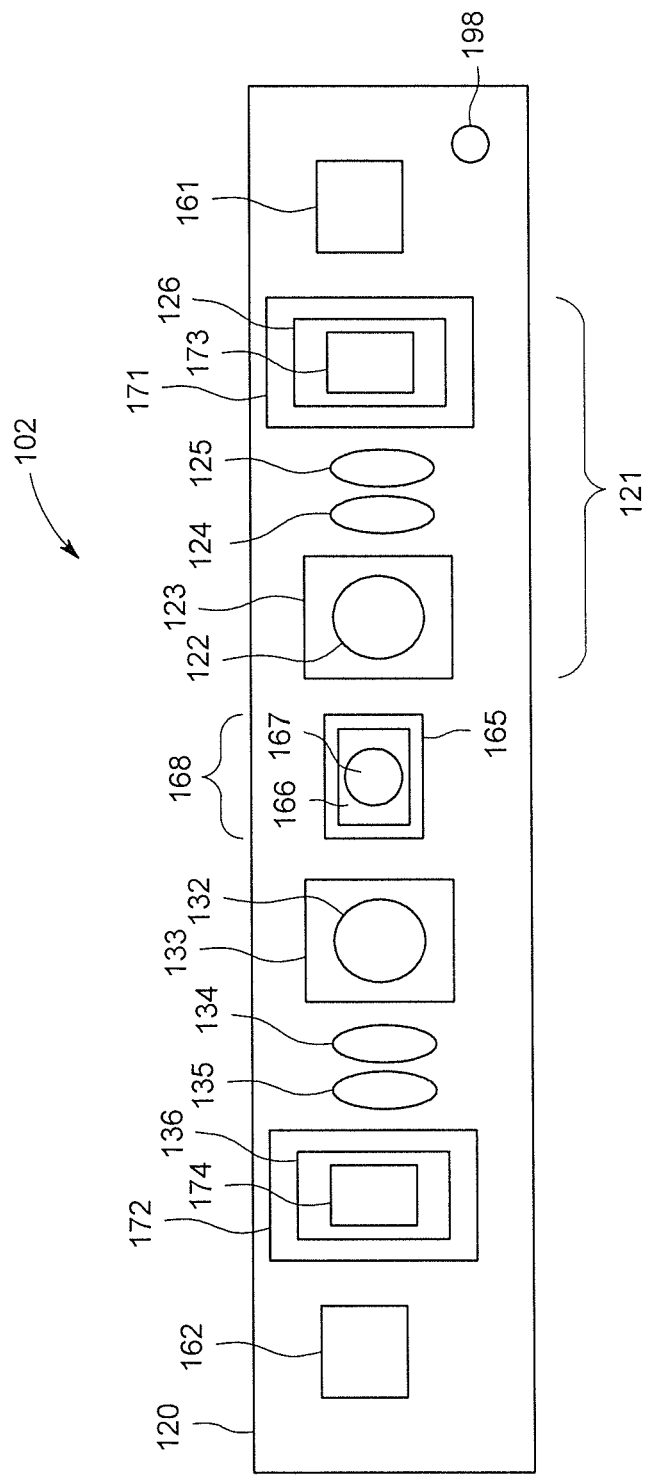
FIG. 2 is a schematic diagram of an exemplary head assembly of a probe.
Figure 3:
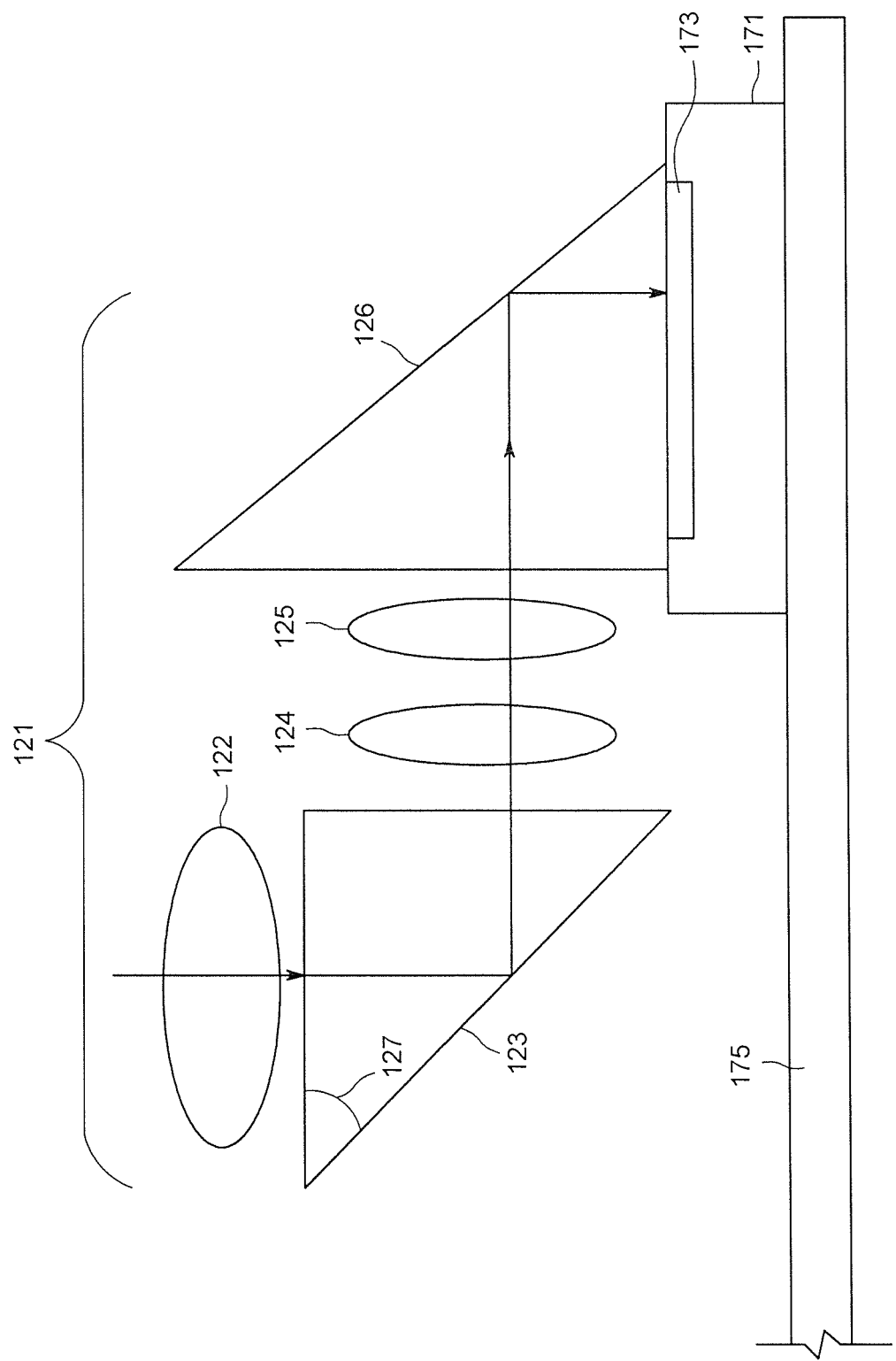
FIG. 3 is an elevation view of the exemplary first optics system and first image sensor shown in FIG. 2.

FIG. 2 is a schematic diagram of an exemplary head assembly 120 of a probe 102 (e.g., a rigid cylindrical probe). The exemplary stereoscopic imaging system comprises two image sensors 171, 172 and two optics systems 121, 131 associated with the image sensors 171, 172 to provide two or more fields of view (e.g., left and right). The first optics system 121 can include a first lens 122 positioned in front of a first prism 123, which is adjacent to a lens train including a second lens 124 and a third lens 125 located between the first prism 123 and the first image sensor 171. The first optics system 121 can include a second prism 126 on top of the first active area 173 of the first image sensor 171. An elevation view of the first optics system 121 and first image sensor 173 is shown in FIG. 3. As can be seen in FIG. 3, the light from the object under inspection passes through the first lens 122, is reflected by the first prism 123, passes through the second lens 124 and third lens 125, and is reflected by the second prism 126 onto the active area 173 of the first image sensor 171, which is connected to the image sensor substrate 175. The prism angle 127 of the first prism 123 can be adjusted to provide the desired convergence angle of the stereoscopic fields of view. In one embodiment, the first prism 122 and/or the second prism 126 can be a right angle prism. In another embodiment, the prism angle 127 can be less than a right angle (e.g., 80 degrees) so that the fields of view converge. In another embodiment, the first active area 173 of the first image sensor 171 can be rotated 90 degrees to eliminate the need for the second prism 126.

Returning to FIG. 2, the second optics system 131 can include a first lens 132 positioned in front of a first prism 133, which is adjacent to a lens train including a second lens 134 and a third lens 135 located between the first prism 133 and the second image sensor 172. The second optics system 131 can include a second prism 136 on top of the second active area 174 of the second image sensor 172.

The exemplary embodiment of the rigid probe 102 shown in FIGS. 2 and 3 have the benefit of minimizing the diameter of the probe 102 while still allowing relatively long lens trains. It will be understood that the exemplary first probe optics 121 and second probe optics 131 are just one example of the arrangement of lenses and prisms that can be used. For example, in one embodiment, the probe optics 121, 131 can only include lenses and no prisms if no reflection or change in direction is required. Furthermore, by changing the angle on the prisms or lenses, the views can be configured to converge on the object surface a desired angle.

The inspection mode light emitters 160 (FIG. 1) of the exemplary head assembly 120 of a probe 102 shown in FIG. 2 can include a first inspection mode LED 161 and a second inspection mode LED 162. In one embodiment, the inspection mode LEDs 161, 162 are one or more white LEDs and provide diffuse light to illuminate the object. In the exemplary embodiment, the first inspection mode LED 161 is located on a first (left) side of the head assembly 120 (facing out in FIG. 2) proximate the first image sensor 171 and the second inspection mode LED 162 is located on the second (right) side of the head assembly 120 proximate the second image sensor 172, opposite of the first inspection mode LED 161. In one embodiment, an optic system (not shown) can work in conjunction with the inspection mode LEDs 161, 162 to focus the diffuse illumination on the object.

In stereoscopic imaging and measurement, two field of view images (e.g., a left image and right image) of an object surface are captured from slightly different perspectives. To perform stereoscopic measurement on the two images, a processor, which may be contained within the video inspection device or be located remotely such as in a cloud server, identifies matching points in the two images. Stereoscopic imaging can be used to inspect a turbine blade. Many turbine blades have smooth surfaces provided by ceramic thermal barrier coatings that have minimal surface details. Since stereoscopic imaging is dependent upon finding the same points on the surface in both stereo images, such surfaces that have minimal surface detail can result in false matching and inaccurate three-dimensional mapping. In addition to trying to identify anomalies on a turbine blade, another potential inspection of a turbine blade is to inspect a ceramic creep gauge that is placed on turbine blades to detect elongation of the blades. The use of stereoscopic imaging on these ceramic creep gauges, which also have minimal surface detail, can also result in false matching and inaccurate three-dimensional mapping.

To address the issues associated with stereoscopic imaging of surfaces with minimal detail, returning to FIGS. 1 and 2, the exemplary head assembly 120 of the probe 102 of the video inspection device 101 includes a textured pattern projection system 168 for projecting a textured pattern on to the object surface to provide more surface detail for more reliable stereo matching. The exemplary textured pattern projection system 168 is located in-between the first image sensor 171 and the second image sensor 172, and is also located between the first inspection mode LED 161 and the second inspection mode LED 162. In this exemplary configuration shown in FIG. 2, the first image sensor 171 is located between the textured pattern inspection system 168 and the first inspection mode LED 161, and the second image sensor 172 is located between the textured pattern inspection system 168 and the second inspection mode LED 162.

Figure 4:
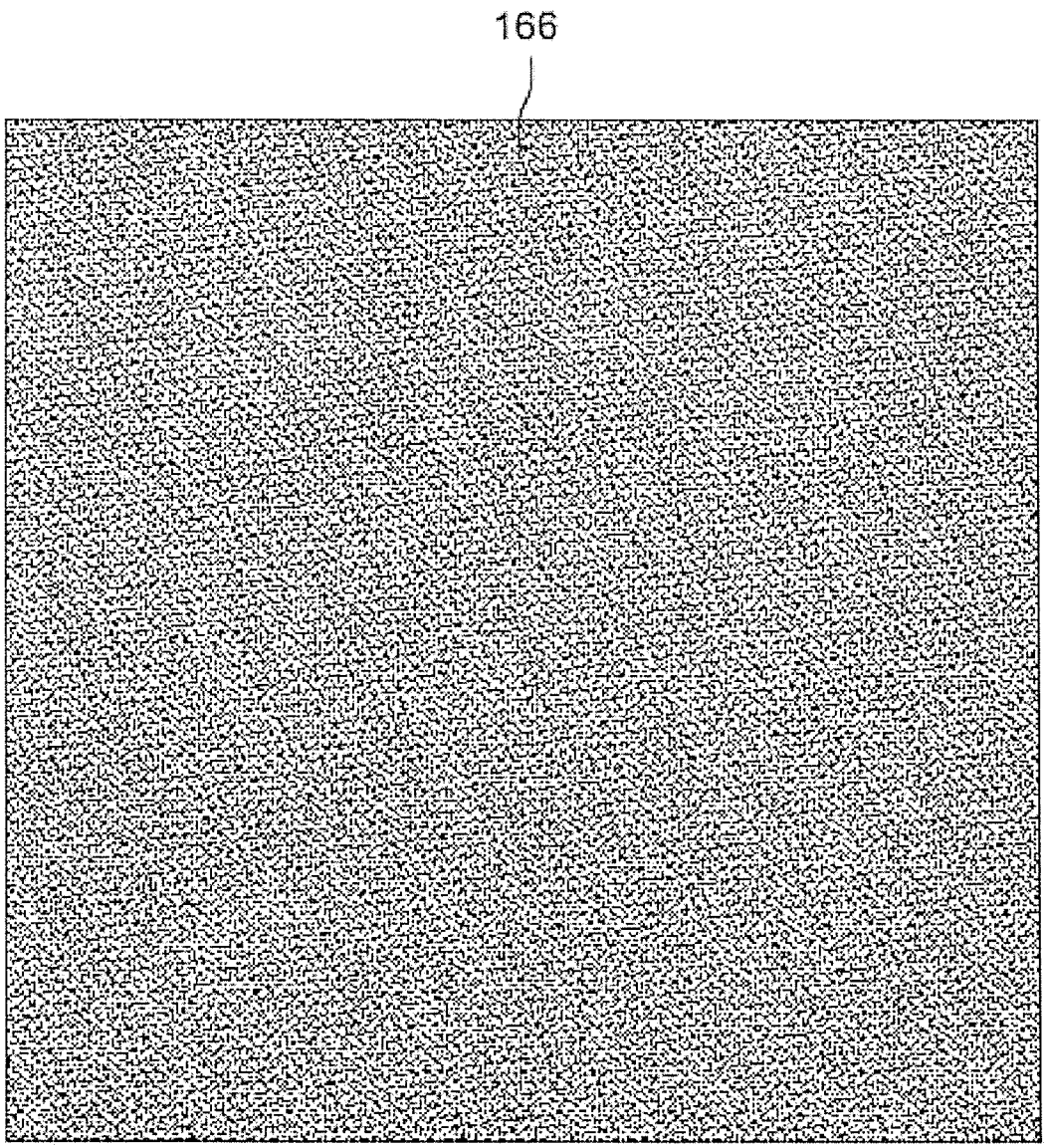
FIG. 4 illustrates an exemplary textured pattern.

The exemplary textured pattern projection system 168 includes one or more measurement mode light emitters (e.g., LEDs) 165, a textured pattern 166 located proximate (e.g., on top of) the measurement mode light emitters 165, and textured pattern projection optics system 167. The textured pattern 166 can be applied as an opaque chrome pattern deposited on a glass window, where the glass window is located on top of the surface of the LED. In one embodiment, a random or semi-random arrangement of dots is used, where the density of the dots is varied to achieve a more uniform low frequency brightness distribution of the projected textured pattern on the surface. An exemplary textured pattern 166 is shown in FIG. 4. The textured pattern can include high-frequency light and dark areas that are organized in a manner that improves the ability of the stereo matching process to determine the correct match disparities relative to when only diffuse illumination is provided.

Illumination from the measurement mode light emitters 165 passes through the textured pattern 166, which is focused and projected by the textured pattern projection optics system 167 onto the object under inspection. In one embodiment, the textured pattern projection optics system 167 includes one or more lenses for focusing an image of the textured pattern onto the object. Adding an image of the textured pattern to a surface with minimal detail adds surface detail and allows for better matching in stereoscopic images, which leads to more accurate three-dimensional data (e.g., surface map) of the object surface.

Figure 5:
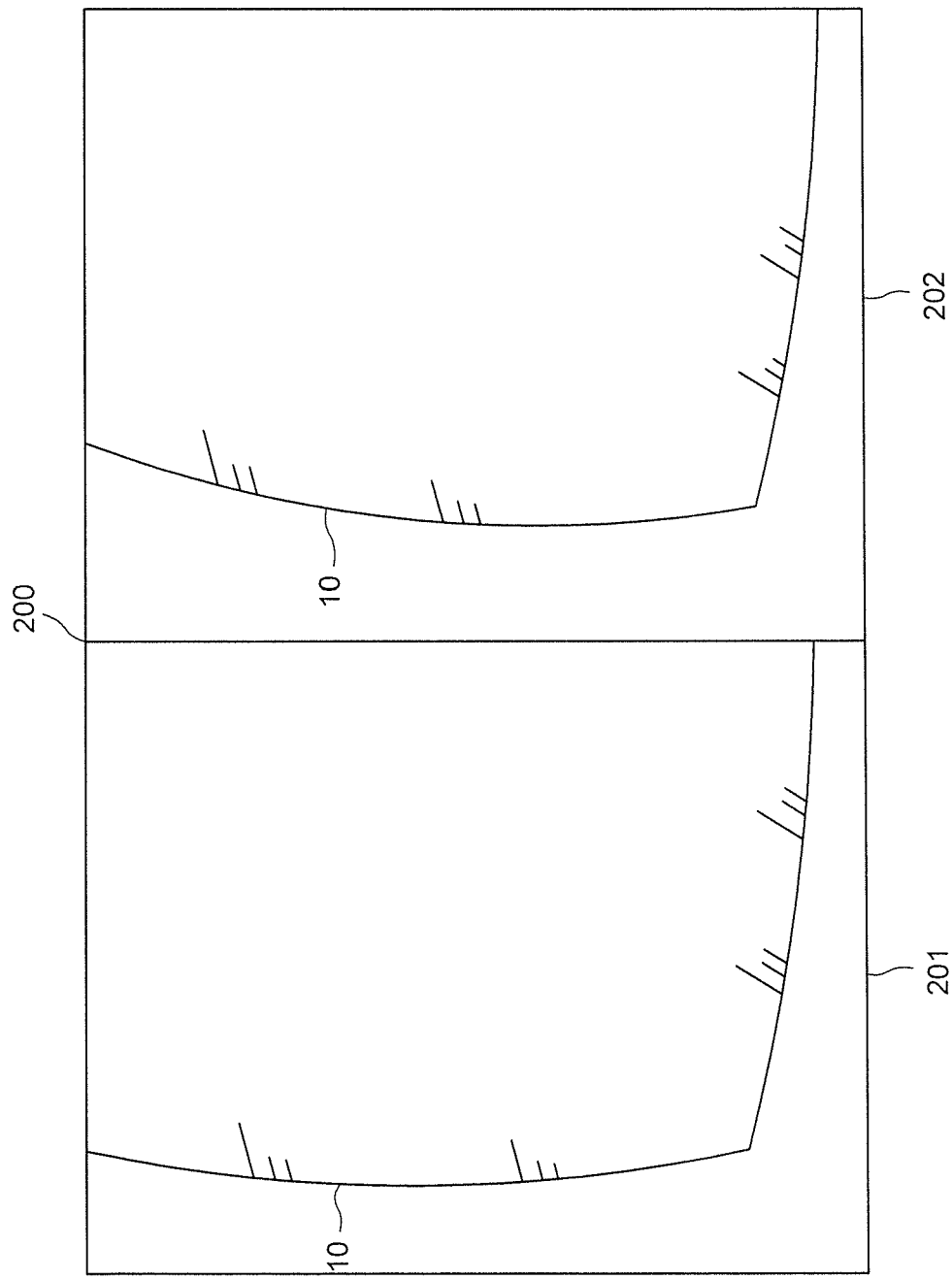
FIG. 5 illustrates a stereoscopic image of a turbine blade.

FIG. 5 shows a stereoscopic image 200 of a turbine blade 10 captured when the inspection mode light emitters 160 provide diffuse light to illuminate the turbine blade 10. The stereoscopic image 200 includes a first (left) image 201 from the first field of view and a second (right) image 202 from the second field of view. As can be seen in FIG. 5, since the turbine blade 10 has minimal surface details, the stereoscopic matching may be difficult and may lead to erroneous matches, compromising the resulting three-dimensional data and measurements.

Figure 6:
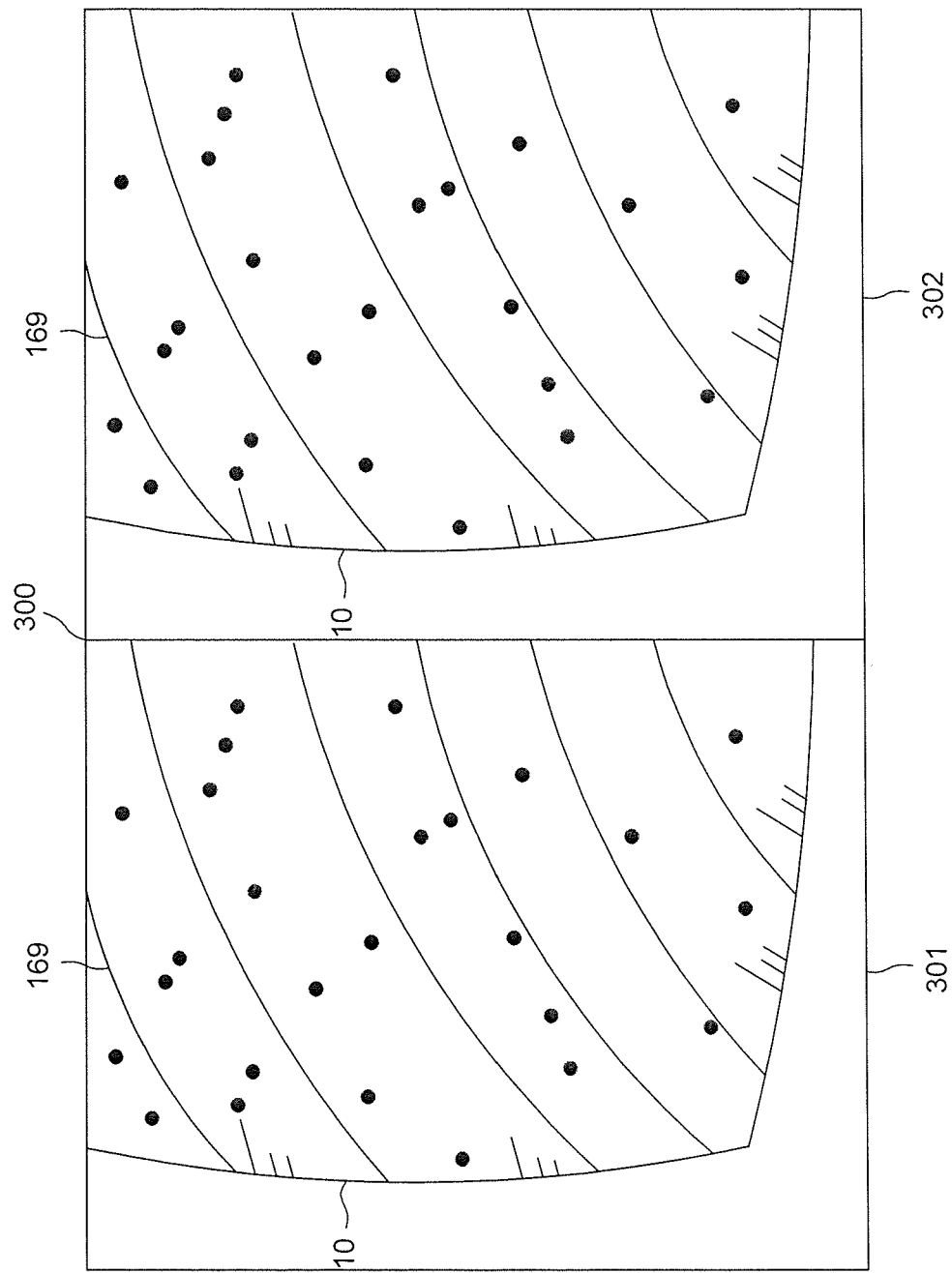
FIG. 6 illustrates a stereoscopic image with a textured pattern projected onto a turbine blade.

FIG. 6 shows a stereoscopic image of a turbine blade 10 captured when the measurement mode light emitters 165 provide illumination of the turbine blade 10. The stereoscopic image 300 includes a first (left) image 301 from the first field of view and a second (right) image 302 from the second field of view. As can be seen in FIG. 6, the stereoscopic image now has a textured pattern 169 projected onto the turbine blade 10 as the illumination from the measurement mode light emitters 165 passes through the textured pattern 166, which is focused and projected by the textured pattern projection optics system 167 onto the turbine blade 10 (FIGS. 1 and 2). As can be seen in FIG. 6, because the textured pattern 169 projected on the turbine blade 10 provides more surface detail, stereoscopic matching accuracy is enhanced.

The exemplary video inspection device 101 shown in FIGS. 1-4 can operate in an inspection mode where the inspection mode light emitters 160 (e.g., first and second inspection mode LEDs 161, 162) provide diffuse illumination of the object (FIG. 5), and a measurement mode, were the measurement mode light emitters 165 provide illumination of the object, projecting a textured pattern 169 onto the object (FIG. 6). In conducting an inspection of a rotating industrial asset (e.g., a turbine blade), the video inspection device 101 can capture and save a still two-dimensional image of the object in inspection mode (FIG. 5) and also capture and save a still two-dimensional image of the object in measurement mode (FIG. 6), with the image captured in measurement mode used to provide a three-dimensional map of the object surface.

In one embodiment, the measurement mode light emitters 165 can emit a narrow spectrum of light (e.g., green) to provide monochromatic illumination for higher accuracy three-dimensional data obtained from the stereoscopic images by eliminating the effects of color separation in the viewing optics that may occur with a broad spectrum of light provided by white LEDs. In these applications (e.g., power applications), the image sensors 171, 172 may be black and white rather than color. In applications such as inspection of aviation turbine blades that may require color sensors, white LEDs can be used for the measurement mode light emitters 165. In one embodiment, in order to minimize any blurring that may be caused by the rotation of the turbine blades, the inspection mode light emitters 160 and/or measurement mode light emitters 165 used to illuminate the object surface can be pulsed.

Figure 7:
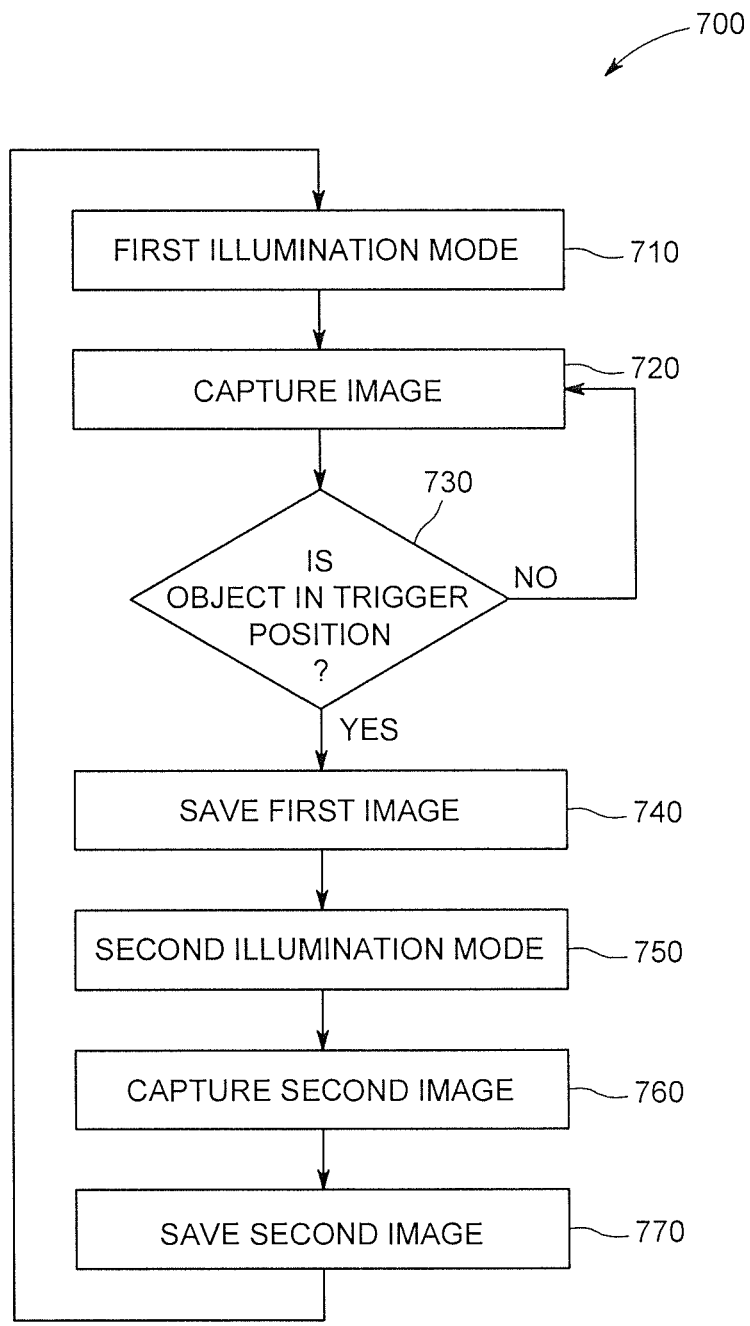
FIG. 7 illustrates an exemplary method for capturing and saving images of a rotating industrial asset in a selected position (trigger position) in both a first and a second illumination mode.

In order to reduce the amount of data required for the images captured and saved during an inspection, in one embodiment, the video inspection device 101 saves only selected images of turbine blades in a selected viewing position (or trigger position) in the frame. FIG. 7 illustrates and exemplary method 700 for capturing and saving images of a rotating industrial asset (e.g., a turbine blade) in a selected position (trigger position) in both a first illumination mode and a second illumination mode. In conducting an inspection, the video inspection device 101 can capture still two-dimensional images, for instance, at a rate of 60 frames per second.

In the first described embodiment of the method 700 shown in FIG. 7, the first illumination mode is an inspection mode and the second illumination mode is a measurement mode. At step 710, the video inspection device 101 is configured and operated in a first illumination mode (inspection mode) where the inspection mode light emitters 160 (e.g., first inspection mode LED 161 and a second inspection mode LED 162) provide diffuse illumination of the object surface (FIGS. 1 and 2). At step 720, one or more of the image sensors 171, 172 of the video inspection device 101 capture a two-dimensional still image (e.g., a stereoscopic image) of the object surface in the first illumination mode. As will be discussed in more detail below with respect to FIG. 11, at step 730, the video inspection device 101 determines whether the object is in a selected position or trigger position in the captured image frame for inspecting the object. For example, for the inspection of a rotating turbine blade, the trigger position could be a position of the turbine blade in the frame where all or the majority of the turbine blade is visible and free from obstructions from other structures (e.g., other turbine blades, vanes, shrouds, etc.) and is an appropriate distance from the video inspection device 101.

If the object is not in the trigger position, the captured two-dimensional still image of the object surface is discarded and the method 700 may return to step 720, where one or more of the image sensors 171, 172 of the video inspection device 101 capture another two-dimensional still image of the object surface in the first illumination mode. Then step 730 may be repeated. When the video inspection device 101 at step 730 determines that the object is in the trigger position, the method 700 proceeds to step 740 where the video inspection device saves, e.g., in non-volatile memory, the captured two-dimensional still image of the object surface in the first illumination mode. This saved two-dimensional still image of the object surface captured in inspection mode can be used to perform visual analysis of the object surface.

At step 750, the video inspection device 101 switches to a second illumination mode (measurement mode) where the measurement mode light emitters (e.g., one or more LEDs) 165 provide illumination of the object projecting a textured pattern onto the object (FIGS. 1 and 2). At step 760, one or more of the image sensors 171, 172 of the video inspection device 101 capture a two-dimensional still image (e.g., a stereoscopic image) of the object surface in the second illumination mode. The method 700 proceeds to step 770 where the video inspection device saves, e.g., in non-volatile memory, the captured two-dimensional still image of the object surface in the second illumination mode. This saved two-dimensional still image of the object surface captured in measurement mode with the projected textured surface can be used to provide a three-dimensional map of the object surface. Now that two images have been saved for the object in or near the trigger position, a first image in the first illumination mode and a second image in the second illumination mode, the video inspection device 101 may switch back to the first illumination mode in step 710 and can repeat the method for the next object (e.g., the next turbine blade).

In the second described embodiment of the method 700 shown in FIG. 7, the first illumination mode is a measurement mode and the second illumination mode is an inspection mode. At step 710, the video inspection device 101 is configured in a first illumination mode (measurement mode) where the measurement mode light emitters (e.g., one or more LEDs) 165 provide illumination of the object projecting a textured pattern onto the object (FIGS. 1 and 2). At step 720, one or more of the image sensors 171, 172 of the video inspection device 101 capture a two-dimensional still image (e.g., a stereoscopic image) of the object surface in the first illumination mode. At step 730, the video inspection device 101 determines whether the object is in a selected position or trigger position in the captured image frame for inspecting the object.

If the object is not in the trigger position, the captured two-dimensional still image of the object surface is discarded and the method 700 may return to step 720, where one or more of the image sensors 171, 172 of the video inspection device 101 capture another two-dimensional still image of the object surface in the first illumination mode. Then step 730 may be repeated. When the video inspection device 101 at step 730 determines that the object is in the trigger position, the method 700 proceeds to step 740 where the video inspection device saves, e.g., in non-volatile memory, the captured two-dimensional still image of the object surface in the first illumination mode. This saved two-dimensional still image of the object surface captured in measurement mode with the projected textured surface can be used to provide a three-dimensional map of the object surface.

At step 750, the video inspection device 101 switches to a second illumination mode (inspection mode) where the inspection mode light emitters 160 (e.g., first inspection mode LED 161 and a second inspection mode LED 162) provide diffuse illumination of the object surface (FIGS. 1 and 2). At step 760, one or more of the image sensors 171, 172 of the video inspection device 101 capture a two-dimensional still image (e.g., a stereoscopic image) of the object surface in the second illumination mode. The method 700 proceeds to step 770 where the video inspection device saves, e.g., in non-volatile memory, the captured two-dimensional still image of the object surface in the second illumination mode. This saved two-dimensional still image of the object surface captured in inspection mode can be used to perform visual analysis of the object surface. Now that two images have been saved for the object in or near the trigger position, a first image in the first illumination mode and a second image in the second illumination mode, the video inspection device 101 switches back to the first illumination mode in step 710 and repeats the method for the next object (e.g., the next turbine blade).

In one embodiment described above, during inspection mode, the inspection mode light emitters 160 can be turned on and the measurement mode light emitters 165 can be turned off. Similarly, during measurement mode, the measurement mode light emitters 165 can be turned on and the inspection mode light emitters 160 can be turned off.

In another embodiment, during inspection mode, the inspection mode light emitters 160 and the measurement mode light emitters 165 are turned on with the brightness of the inspection mode light emitters 160 exceeding the brightness of measurement mode light emitters 165. Similarly, during measurement mode, the measurement mode light emitters 165 and the inspection mode light emitters 160 are turned on, with the brightness of the measurement mode light emitters 165 exceeding the brightness of the inspection mode light emitter 160.

By switching between the two illumination modes based on the trigger position of the turbine blade, two or more saved images for each blade (i.e., one image saved from the inspection mode and one image saved from the measurement mode) are captured and then can be used for automated analysis, including automatic defect recognition (ADR). A video recording of the entire inspection can also be saved and used for automated analysis. Furthermore, automated analysis can be conducted for each turbine blade since the images of each turbine blade are taken from a consistent positon of the probe camera relative to the surface of the blade since the images are taken at or near the trigger position. Since these images of all of the turbine blades are taken from a consistent perspective, this can allow algorithms for automated analysis to work more reliably.

The two-dimensional images and three-dimensional data for each turbine blade can be used to assess the condition of the turbine blade. In one example of automated analysis, the image saved during inspection mode can be analyzed to identify any discoloration on the object surface, while the image saved during measurement mode (with the textured pattern) can be used to create a three-dimensional map of the object surface to determine whether the discoloration is indicative of an anomaly. In another example, since a three-dimensional map is available for each turbine blade, the three-dimensional map of a first turbine blade can be compared to the three-dimensional map of a second blade to determine if there are differences between the turbine blades indicative of an anomaly (missing corner, missing coating, dent, pit, etc.). For example, the difference between the two three-dimensional maps can be compared to a threshold and if the difference exceeds a threshold, an indication of an anomaly is provided.

Because of the efficiencies created by only saving selected images of each of the turbine blades in the ideal trigger positions, those images and the resulting three-dimensional data can be transmitted wirelessly or with a wired interface to a cloud-based server(s) 190 (FIG. 1) where the automated analysis, including ADR, can be performed. Having the images and data associated with each turbine blade can enable the use of trending, predictive maintenance, and other techniques that can be employed.

Returning again to FIG. 7, step 730 involves determining whether the object is in the trigger position in the captured image. In one embodiment, the determination of the trigger position is done using stereoscopic imaging. Because of a parallax effect in stereoscopic imaging, the horizontal spacing or disparity value between matching points in the two images is dependent upon the distance from the object surface, which allows three-dimensional coordinates of the surface to be computed. For example, the disparity value between the right image position and left image position for a point on the object surface that is closer to the image sensor will be smaller than the disparity value between the right image position and left image position for a point on the object surface that is further from the image sensor.

Figure 8:
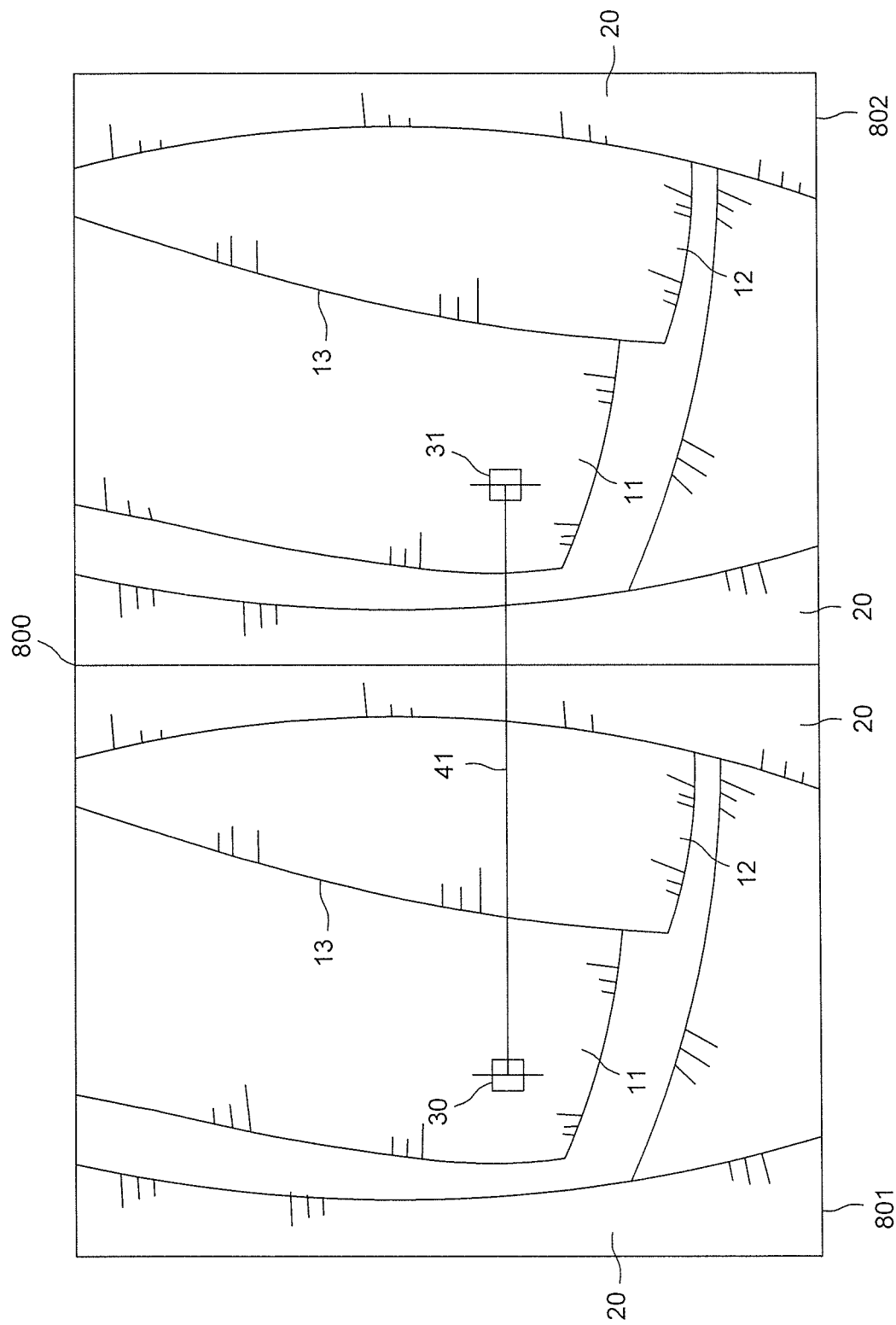
FIG. 8 illustrates a first stereoscopic image captured before an object is in the trigger position.
Figure 9:
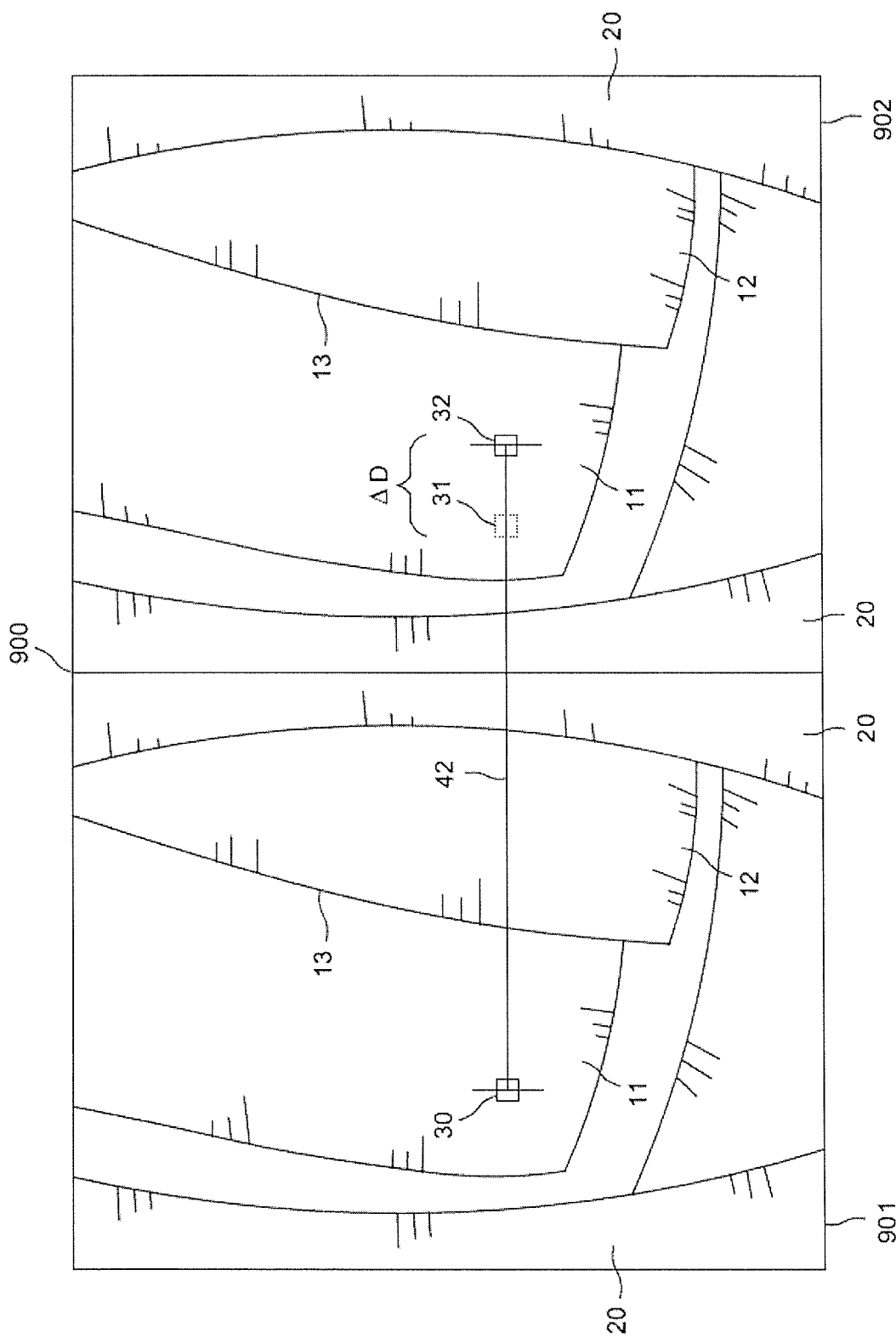
FIG. 9 illustrates a second stereoscopic image captured before an object is in the trigger position.
Figure 10:
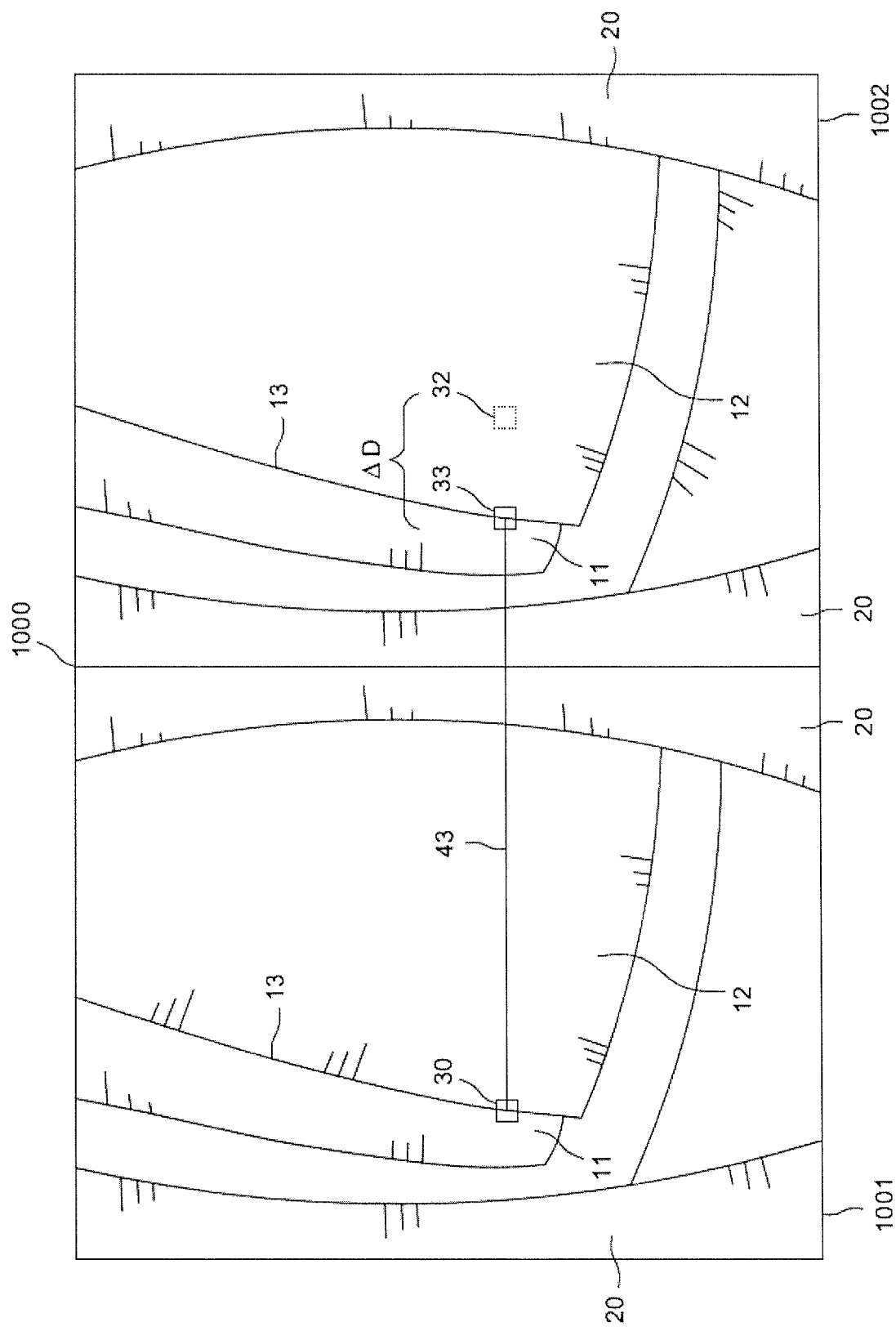
FIG. 10 illustrates a third stereoscopic image captured with an object in the trigger position.
Figure 11:
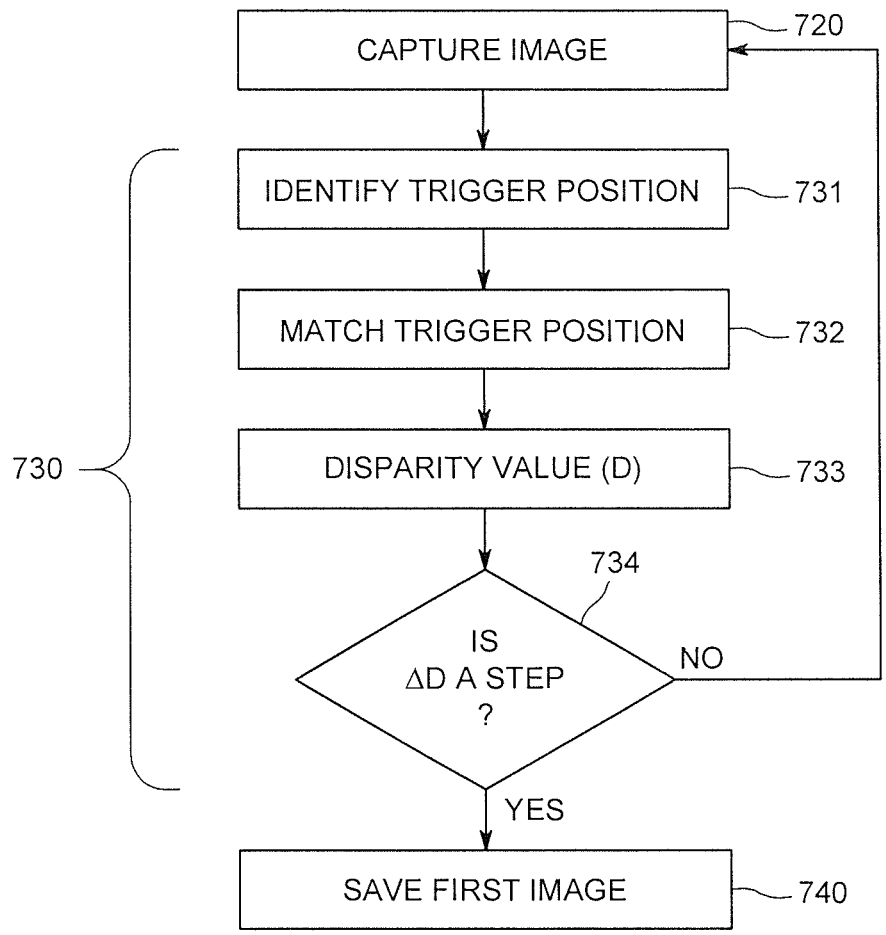
FIG. 11 illustrates an exemplary method for determining whether an object is in the trigger position in a captured image.

FIG. 11 illustrates an exemplary method for determining whether an object (e.g., a turbine blade) is in the trigger position in a captured stereoscopic image. FIGS. 8 and 9 illustrate a first stereoscopic image 800 (FIG. 8) and a second stereoscopic image 900 captured before an object (second turbine blade 12) is in the trigger position, while FIG. 10 illustrates a third stereoscopic image 1000 captured with an object (second turbine blade 12) in the trigger position. In the exemplary embodiment for determining whether the object (e.g., the turbine blade) is in the trigger position, the video inspection device 101 employs edge detection to determine if the forward (left) edge 13 of the second turbine blade 12 (rotating right to left in FIGS. 8-10) in the image is in an ideal position for inspection. In the exemplary embodiment illustrated in FIGS. 8-11, the video inspection device 101 detects the forward (left) edge 13 of the second turbine blade 12 by monitoring for a significant change (e.g., a step change greater than a threshold change value) in the disparity values between the left image and the right image in successive frames.

Returning to FIGS. 7 and 11, at step 720, one or more of the image sensors 171, 172 of the video inspection device 101 (FIGS. 1 and 2) capture a two-dimensional still first stereoscopic image 800 (FIG. 8) in the first illumination mode. Although the textured pattern is not shown in FIGS. 8-10, it will be understood that the first illumination mode can be the inspection mode or the measurement mode described above. As shown in FIG. 8, the first stereoscopic image 800 includes a left image 801 from the first field of view and a right image 802 from the second field of view. The object under inspection is a turbine engine with stationary vanes 20, a first turbine blade, and a second turbine blade 12 having a forward (left) edge 13. At step 731 (FIG. 11), a trigger position block of pixels 30 (e.g., a 9×9 block) is identified in the left image 801 at a location where the forward (left) edge 13 of the second turbine blade 12 may be located in the ideal or trigger position for capturing and saving an image of the second turbine blade 12 as the blade rotates from the right to the left in the views shown in FIGS. 8-10. The trigger position block 13 can be identified either manually by the operator, or automatically via a pre-defined inspection script, in one of the fields of view (e.g., the left image 801 in FIG. 8).

At step 732, the video inspection device 101 identifies a first matching trigger position block of pixels 31 in the right image 802 and determines the horizontal spacing or first disparity value (D1) 41 between the matching blocks 30, 31. When the trigger position block 30 is located on the further turbine blade (first turbine blade 11), there is a larger horizontal spacing or disparity value between the matching blocks 30, 31 than there would be if the trigger position block 30 were closer to the video inspection device 101.

As shown in FIG. 9, the second stereoscopic image 900 includes a left image 901 from the first field of view and a right image 902 from the second field of view. As the turbine blades 11, 12 move from right to left (comparing the position of the turbine blades 11, 12 in FIG. 8 to FIG. 9) and the trigger position block 30 remains located on the further first turbine blade 11, the horizontal spacing or disparity value will continue to increase slightly from frame to frame. As shown in FIG. 9, the trigger position block of pixels 30 is identified in the left image 901. At step 732 (FIG. 11), the video inspection device 101 identifies a second matching trigger position block of pixels 32 in the right image 902. At step 733 (FIG. 11), the video inspection device 101 determines the horizontal spacing or second disparity value (D2) 42 between the matching blocks 30, 32.

As can be seen by a comparison of FIGS. 8 and 9, the second disparity value (D2) 42 (FIG. 9) is slightly greater than the first disparity value (D1) 41 (FIG. 8) such that the change in disparity value ($\Delta D$) between the first stereoscopic image 800 and the second stereoscopic image 900 is a positive number ($\Delta D=D2-D1>0$). This increase is disparity value is also shown by the change in position from the first matching block 31 in FIG. 8 to the second matching block 32 in FIG. 9. As the turbine blades 11, 12 move from right to left (comparing the position of the turbine blades 11, 12 in FIG. 8 to FIG. 9) and the trigger position block 30 remains located on the further first turbine blade 11, the horizontal spacing or disparity value will continue to increase slightly from frame to frame (i.e., ($\Delta D>0$) until the trigger position block 30 is located on the closer second turbine blade 12 (e.g., on the forward (left) edge 13) as shown in FIG. 10. This positive change ($\Delta D>0$) in disparity value from the first stereoscopic image 800 (FIG. 8) (i.e., the previous image) to the second stereoscopic image 900 (FIG. 9) and that fact that the magnitude or absolute value of the change ($|\Delta D|$) is less than (i.e., not greater than) a threshold value for the change in disparity value ($|\Delta D|<\Delta D_{TH}$) indicates that a disparity value step has not been detected at step 734 (FIG. 11), causing the method to return to capturing another stereoscopic image at step 720.

As shown in FIG. 10, the third stereoscopic image 1000 includes a first (left) image 1001 from the first field of view and a second (right) image 1002 from the second field of view. As the turbine blades 11, 12 move from right to left (comparing the position of the turbine blades 11, 12 in FIG. 9 to FIG. 10) and the trigger position block 30 is now located on the closer second turbine blade 12, the horizontal spacing or third disparity value (D3) 43 may decrease significantly from the previous frame. As shown in FIG. 10, the trigger position block of pixels 30 is identified in the left image 1001. At step 732 (FIG. 11), the video inspection device 101 identifies a third matching trigger position block of pixels 33 in the right image 1002 and determines the horizontal spacing or second disparity value (D3) 43 between the matching blocks 30, 33.

As can be seen by a comparison of FIGS. 9 and 10, the third disparity value (D3) 43 (FIG. 10) is significantly less than the second disparity value (D2) 42 (FIG. 9) such that the change in disparity value (ΔD) between the second stereoscopic image 900 and the third stereoscopic image 1000 is a negative number (ΔD=D3−D2<0). This decrease in disparity value is also shown by the change in position from the second matching block 32 in FIG. 9 to the third matching block 33 in FIG. 10. As the turbine blades 11, 12 move from right to left (comparing the position of the turbine blades 11, 12 in FIG. 9 to FIG. 10) and the trigger position block 30 is now located on the closer second turbine blade 12, the horizontal spacing or disparity value may decrease significantly (i.e., (ΔD<0). This negative change (ΔD<0) in disparity value from the second stereoscopic image 900 (FIG. 9) to the third stereoscopic image 1000 (FIG. 10) and that fact that the magnitude or absolute value of the change (|ΔD|) is greater than a threshold value for the change in disparity value (|ΔD|>ΔD$_{TH}$) indicates that a disparity value step has been detected at step 734 (FIG. 11), causing the method to move forward to step 740 and save the third stereoscopic image 1000 with the second turbine blade in the trigger position.

In summary for the exemplary embodiment illustrated in FIGS. 8-11, the video inspection device 101 compares the disparity values between the matching blocks of successive frames (i.e. between a previous image and a later image) and if the change in disparity value is negative and the absolute value of that change is greater than a predetermined threshold, the video inspection device 101 determines that the object is in the trigger position and saves the latest image.

In another embodiment, a first block of pixels is identified in the left image at a location slightly left of where the forward (left) edge of the turbine blade will be located in the ideal or trigger position and a second block of pixels is identified in the right image at a location slightly right of where the forward (left) edge of the turbine blade can be located in the ideal or trigger position. Using stereoscopic imaging, the video inspection device 101 identifies matching blocks of pixels in the right image. As the turbine blades move from right to left, the video inspection device can determine and compare the disparity value for the first block of pixels to the disparity value for the second block of pixels. When the first and second blocks of pixels are located on the same turbine blade (e.g., on the further turbine blade (first turbine blade)) in an image, there may be only a slight difference between the two disparity values. At the trigger position, however, the disparity value for the first block of pixels (located on the first turbine blade just left of the front edge of the second turbine blade) may be significantly higher than the disparity value of the second block of pixels (located on the second turbine blade just right of the front edge of the second turbine blade) and can indicate that the turbine blade is located in the trigger position.

In yet another embodiment, the disparity value of the trigger position block is associated with a distance between the inspection device and the object surface. For each frame, that distance associated with that frame's disparity value is compared to a threshold. When the associated distance falls below the threshold, the trigger position is confirmed and the image is saved.

While blocks of pixels have been used in these exemplary embodiments to identify the trigger position, the trigger position can be identified by multiple blocks forming a trigger line along the edge of the blade. Also, while a single trigger position was used in these exemplary embodiments to save a single image obtained at that trigger position, in another embodiment, multiple trigger positions can be identified, each triggering the capture of a stereoscopic image. For example, if the forward edge of a turbine blade passes a start trigger position, stereoscopic images can be captured and saved at predefined intervals until the forward edge of the turbine blade passes a stop trigger position. In another embodiment, the turbine blades passing the field of view are counted, and the captured and saved images are associated with a turbine blade number. In another aspect, the number of turbine blades in the stage being inspected is known, and the video inspection device notifies the operator when images of all turbine blades have been captured.

Figure 12:
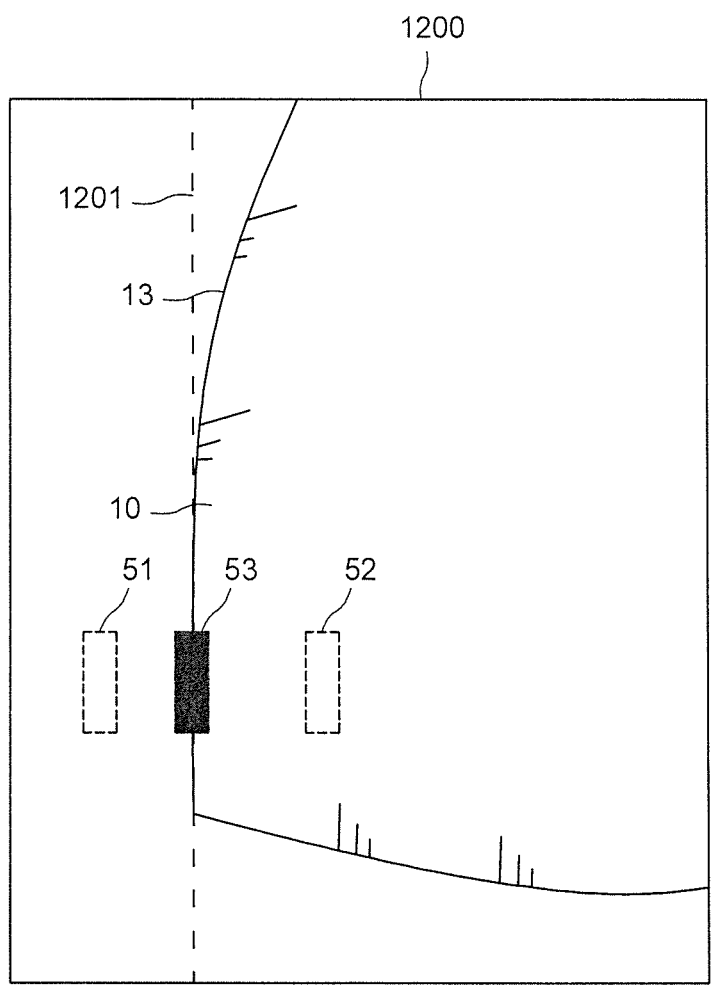
FIG. 12 illustrates an image captured with an object in the trigger position.

To illustrate yet another embodiment determining whether the object is in the trigger position in the captured image, FIG. 12 illustrates an image 1200 captured with an object (e.g., turbine blade 10) in the trigger position 1201. Returning to FIGS. 1 and 2, the video inspection device 101 can include a projected light emitter (e.g., a laser or LED) 198 for projecting a projected light pattern offset from the image sensors 171, 172 onto the object. It will be understood that this embodiment, employing a projected light emitter 198, can be used with stereoscopic images and non-stereoscopic images.

As shown in FIG. 12, the video inspection device 101 uses a projected light pattern (e.g., a laser dot or line) for determining whether the object (e.g., the turbine blade 10) is in the trigger position. As shown in FIGS. 2 and 12, the probe 102 includes a projected light emitter 198 that projects a light pattern (e.g., dot or line) from a position offset from that of the image sensor 171, 172 such that the projected light pattern appears in a different location in captured images depending on the distance to the object surface (i.e., the surface of the turbine blade 10) from which the projected light pattern is reflected. For example, when the projected light emitter 198 is located to the left side of the probe 102 as shown in FIG. 2 and the projected light pattern is projected toward the right (e.g., at a 20 degree angle to field of view), when it contacts the object surface of the turbine blade 10 (FIG. 12) at a close distance to the video inspection device 101, the projected light pattern location 51 is to the left in the image 1201. When the projected light pattern contacts the object surface of the turbine blade 10 (FIG. 12) at a far distance to the video inspection device 101, the projected light pattern location 52 is to the right in the image 1201.

The video inspection device 101 can be configured to identify the projected light pattern location 51, 52, 53 in the live video stream produced by the image sensors 171, 172. When the projected light pattern is located at the trigger position 1201 (e.g., position 53 in FIG. 12 on the edge 13 of the turbine blade 10), the video inspection device can save the image for further processing as discussed above.

In view of the foregoing, embodiments of the video inspection device may collect high quality images of an industrial asset for inspection. A technical effect is a reduction in the level of image processing that may be required to determine when a rotating object, such as a turbine blade, is in the desired position for image capture as compared to other embodiments. This allows for each image to be taken from a consistent perspective and position enabling automated analysis of the rotating objects. By saving only selected images of turbine blades in a selected viewing position in the frame, images for each turbine blade can be saved and used to create three-dimensional surface maps for each turbine blade without requiring a high or excessive amount of data to be transferred or stored. Enabling automated analysis of the industrial asset can allow for predictive maintenance and asset performance management. In addition, adding a textured pattern to an object surface can provide sufficient surface detail to allow the creation of a more accurate three-dimensional surface map via improved stereo matching on a surface that does not otherwise have sufficient detail.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "service," "circuit," "circuitry," "module," and/or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code and/or executable instructions embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

To the extent that the claims recite the phrase "at least one of" in reference to a plurality of elements, this is intended to mean at least one or more of the listed elements, and is not limited to at least one of each element. For example, "at least one of an element A, element B, and element C," is intended to indicate element A alone, or element B alone, or element C alone, or any combination thereof. "At least one of element A, element B, and element C" is not intended to be limited to at least one of an element A, at least one of an element B, and at least one of an element C.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A device for inspection of an asset, the device comprising:
   a probe comprising:
      a first image sensor having a first field of view and a second image sensor having a second field of view, converging with at least a portion of the first field of view and configured for obtaining a stereoscopic image, one or more inspection mode light emitters configured for providing illumination of the asset during an inspection mode, a textured pattern projection system for projecting a textured pattern on the asset, the textured pattern projection system comprising, one or more measurement mode light emitters configured for providing illumination of the asset during a measurement mode, a textured pattern located proximate the one or more measurement mode light emitters, and a textured pattern optics system for projecting the textured pattern onto the asset, wherein the textured pattern is located between the one or more measurement mode light emitters and the textured pattern optics system, and probe electronics including one or more processors and a memory configured to, receive a first stereoscopic image captured in the inspection mode, the first stereoscopic image including a first field of view image captured by the first image sensor and a second field of view image captured by the second image sensor, determine if the asset is in a predetermined trigger position in the first stereoscopic image, save the first stereoscopic image when the asset is determined to be in the predetermined trigger position, receive a second stereoscopic image captured in the measurement mode, the second stereoscopic image including respective images captured by the first image sensor and the second image sensor, save the second stereoscopic image, wherein determining whether if the asset is in a predetermined trigger position in the image comprises, identifying the predetermined trigger position in the first field of view image;

identifying a first matching trigger position in the second field of view image;

determining a disparity value between the predetermined trigger position and the first matching trigger position;

determining whether the change between the disparity value and a disparity value of a previous image exceeds a predetermine threshold;

if the change does not exceed the predetermined threshold, receive another first stereoscopic image; and if the change does exceed the predetermined threshold, save the received first stereoscopic image.

2. The device of claim 1, further comprising a first optics system for the first image sensor, the first optics system comprising a first prism.

3. The device of claim 2, wherein the first optics system further comprises a second prism on top of a first active area of the first image sensor.

4. The device of claim 3, wherein the first prism is a right angle prism and the second prism is a right angle prism.

5. The device of claim 1, wherein the textured pattern projection system is located between the one or more inspection mode light emitters and the first and second image sensors.

6. The device of claim 1, wherein the textured pattern is an opaque pattern deposited on a glass window located on top of the one or more measurement mode light emitters.

7. The device of claim 6, where the textured pattern is a semi-random arrangement of dots.

8. The device of claim 1, wherein the one or more inspection mode light emitters are white light emitting diodes.

9. The device of claim 1, wherein the one or more measurement mode light emitters are monochromatic light emitting diodes.

10. The device of claim 1, wherein the textured pattern optics system comprises one or more lenses for projecting the textured pattern onto the asset.

11. A method for inspecting an asset with an inspection device, the method comprising:

(a) operating the inspection device in a first illumination mode;

(b) capturing a first image of the asset in the first illumination mode, wherein the first image is a stereoscopic image comprising a first field of view image and a second field of view image, and wherein a second field of view captured by the second field of view image converges with at least a portion of a first field of view of the first field of view image;

(c) determining if the asset is in a predetermined trigger position in the first image;

(d) saving the first image of the asset in the first illumination mode when the asset is in the predetermined trigger position;

(e) operating the inspection device in a second illumination mode;

(f) capturing a second image of the asset in the second illumination mode; and (g) saving the second image of the asset in the second illumination mode;

wherein the step of determining whether if the asset is in a predetermined trigger position in the image comprises, (c1) identifying the predetermined trigger position in the first field of view image;

(c2) identifying a first matching trigger position in the second field of view image;

(c3) determining a disparity value between the predetermined trigger position and the first matching trigger position;

(c4) determining whether the change between the disparity value and a disparity value of a previous image exceeds a predetermine threshold;

(c5) if the change does not exceed the predetermined threshold, return to step (b); and (c6) if the change does exceed the predetermined threshold, move forward to step (d).

12. The method of claim 11, where in the first illumination mode is an inspection mode where the inspection device illuminates the asset with white diffuse light and the second illumination mode is a measurement mode where the inspection device projects a textured pattern on the surface of the asset.

13. The method of claim 11, where in the first illumination mode is a measurement mode where the inspection device projects a textured pattern on the surface of the asset and the second illumination mode is an inspection mode where the inspection device illuminates the asset with white diffuse light.

14. The method of claim 11, wherein the step of identifying the predetermined trigger position in the first field of view image comprises selecting a block of pixels at a location in the first field of view image where the forward edge of the turbine blade will be located for capturing and saving an image of the turbine blade.

15. The method of claim 11, wherein the step of identifying the predetermined trigger position in the first field of view image comprises generating the predetermined trigger position from a pre-defined inspection script.

16. The method of claim 11, further comprising the steps of repeating steps (a) through (g).

* * * * *